(12) United States Patent
Teng et al.

(10) Patent No.: US 11,253,889 B2
(45) Date of Patent: Feb. 22, 2022

(54) GYPSUM PANELS AND MATS THEREFOR WITH WETTING AGENT TO ENHANCE GYPSUM PENETRATION

(71) Applicant: Georgia-Pacific Gypsum LLC, Atlanta, GA (US)

(72) Inventors: Yi-Hsien Harry Teng, Suwanee, GA (US); Rochelle F. Bradford, Decatur, GA (US)

(73) Assignee: Georgia-Pacific Gypsum LLC, Atlanta, GA (US)

( * ) Notice: Subject to any disclaimer, the term of this patent is extended or adjusted under 35 U.S.C. 154(b) by 31 days.

(21) Appl. No.: 16/574,962

(22) Filed: Sep. 18, 2019

(65) Prior Publication Data
US 2020/0009610 A1 Jan. 9, 2020

Related U.S. Application Data

(62) Division of application No. 15/666,687, filed on Aug. 2, 2017, now Pat. No. 10,478,854.
(Continued)

(51) Int. Cl.
*C04B 32/02* (2006.01)
*C03C 25/54* (2006.01)
*C03C 25/1095* (2018.01)
*B32B 13/14* (2006.01)
*C03C 13/00* (2006.01)
*C04B 28/14* (2006.01)
*D06M 11/83* (2006.01)
(Continued)

(52) U.S. Cl.
CPC .............. *B05D 1/36* (2013.01); *B05D 1/02* (2013.01); *B05D 1/28* (2013.01); *B05D 1/305* (2013.01); *B05D 3/002* (2013.01); *B05D 3/104* (2013.01); *B05D 7/24* (2013.01); *B05D 7/52* (2013.01); *B32B 13/14* (2013.01); *C03C 13/00* (2013.01); *C03C 25/1095* (2013.01); *C03C 25/54* (2013.01); *C04B 28/14* (2013.01); *C04B 32/02* (2013.01); *D06M 11/83* (2013.01); *D06M 13/11* (2013.01); *D06M 13/513* (2013.01); *E04C 2/043* (2013.01); *B05D 2203/30* (2013.01); *B05D 2203/35* (2013.01); *B05D 2401/20* (2013.01); *C03C 2213/00* (2013.01); *C04B 2111/0062* (2013.01); *C04B 2111/00629* (2013.01)

(58) Field of Classification Search
None
See application file for complete search history.

(56) References Cited

U.S. PATENT DOCUMENTS 4,378,405 A * 3/1983 Pilgrim ............... B28B 19/0092
428/322.7
2007/0082170 A1 4/2007 Colbert et al.
(Continued)

OTHER PUBLICATIONS

Material information sheet for SURFYNOL 61 surfactant. Evonik Corporation, Jul. 2017, 2 pages. (Year: 2017).*
(Continued)

*Primary Examiner* — William P Fletcher, III (57) ABSTRACT

In one aspect, a gypsum panel includes a gypsum core, a fiberglass mat, and a wetting agent deposited across an entire thickness of the fiberglass mat. The wetting agent is deposited onto the first fiberglass mat in an uncoated state of the fiberglass mat such that the wetting agent penetrates the entire thickness of the fiberglass mat.

18 Claims, 3 Drawing Sheets

Related U.S. Application Data (60) Provisional application No. 62/370,671, filed on Aug. 3, 2016.

(51) Int. Cl.

| | | |
|---|---|---|
| *D06M 13/11* | (2006.01) | |
| *D06M 13/513* | (2006.01) | |
| *E04C 2/04* | (2006.01) | |
| *C04B 111/00* | (2006.01) | |
| *B05D 1/36* | (2006.01) | |
| *B05D 1/28* | (2006.01) | |
| *B05D 1/30* | (2006.01) | |
| *B05D 3/00* | (2006.01) | |
| *B05D 3/10* | (2006.01) | |
| *B05D 7/24* | (2006.01) | |
| *B05D 7/00* | (2006.01) | |
| *B05D 1/02* | (2006.01) | |

(56) References Cited

U.S. PATENT DOCUMENTS

| | | |
|---|---|---|
| 2007/0093159 A1 | 4/2007 | Kajander |
| 2008/0245012 A1 | 10/2008 | Boisvert et al. |
| 2009/0163097 A1* | 6/2009 | Kajander ............ B32B 5/02 442/118 |
| 2009/0223618 A1 | 9/2009 | Smith |
| 2014/0311073 A1 | 10/2014 | Pool |
| 2016/0222646 A1 | 8/2016 | Thomas |
| 2016/0222647 A1 | 8/2016 | Thomas |
| 2016/0222656 A1 | 8/2016 | Teng |

OTHER PUBLICATIONS

International Search Report and Written Opinion for International Patent Application No. PCT/US2017/045008 dated Nov. 9, 2017 (20 pages).

International Preliminary Report on Patentability for International Patent Application No. PCT/US2017/045008 dated Feb. 5, 2019 (18 pages).

* cited by examiner

GYPSUM PANELS AND MATS THEREFOR WITH WETTING AGENT TO ENHANCE GYPSUM PENETRATION

CROSS-REFERENCE TO RELATED APPLICATIONS

This application is a divisional of U.S. application Ser. No. 15/666,687, filed Aug. 2, 2017, issued as U.S. Pat. No. 10,478,854 B2 on Nov. 19, 2019, which claims priority benefit of U.S. Provisional Application No. 62/370,671, filed Aug. 3, 2016, the disclosures of which are incorporated by reference herein.

FIELD

The present invention relates generally to the field of panels for use in building construction, and more particularly to gypsum panels and methods of making gypsum panels.

BACKGROUND

Typical building panels, or building sheathing, include a core material, such as gypsum, and a mat facer, such as a fiberglass mat facer. During manufacturing, the gypsum core material is traditionally applied as a slurry to a surface of the mat facer and allowed to set, such that the mat facer and gypsum core are adhered at the interface. Often, panels surfer from poor slurry infiltration at the mat facer, resulting in inadequate mat adhesion to the core material and decreased performance.

For example, poor slurry infiltration at the mat facer may lead to increased porosity of the panel, resulting in increased water penetration and decreased weathering performance. Thus, such panels typically do not meet building code requirements for air and water penetration. Indeed, many modern building codes require the use of barriers in construction to protect the building from air and water penetration. For example, building codes in eastern Canada and the northeastern United States now require air barriers to be used in all construction. Moreover, the existing International Building Code/International Residential Code (IBC/IRC) requires the use of a water resistive air barrier for all new construction. Common water-resistive air barriers are formed from a variety of materials and structures and applied to the surface of sheathing panels (e.g., gypsum panels, oriented strand board (OSB) panels).

Traditionally, three types of water-resistive air barriers may be used to meet building codes. First, fabric-type membranes, or "wraps," may be used to cover the surface of building sheathing panels. However, these fabric wraps are typically unable to withstand wind conditions, suffer from drooping, and are difficult to install at heights. Moreover, the standard method of attaching such fabric membranes to sheathing panels is stapling, which compromises the effectiveness of the membrane as an air or water barrier. Second, a liquid coating water resistive air barrier membrane may be applied to sheathing panels. However, these liquid coatings must be applied in the field by qualified contractors, which is time intensive and costly. Moreover, although liquid coatings serve as effective an water barrier, they provide low water vapor permeance, which affects the wall's ability to dry should it get wet during service (e.g., around window penetrations, flashing). Third, self-adhered, or "peel and stick," water resistive air barrier membranes may be applied to sheathing panels. However, these self-adhered membranes are generally not permeable and therefore are not an option in many projects, because the architect or engineer must account for this impermeability in designing the building, to prevent the potential for moisture being trapped inside the wall cavity. Furthermore, self-adhered membranes require the sheathing panels to be dry and often primed prior to application, which significantly slows down the construction process.

Accordingly, it would be desirable to provide panels having enhanced mat-to-core adhesion and/or panel material penetration into the mat, to achieve improved water-resistive and air-barrier properties.

SUMMARY

In one aspect, methods of making gypsum panels are provided, including depositing an aqueous liquid containing a wetting agent onto a first surface of a first fiberglass mat, such that the aqueous liquid penetrates an entire thickness of the fiberglass mat, depositing a gypsum slurry onto the first surface of the first fiberglass mat onto which the aqueous liquid has been deposited, such that the gypsum slurry penetrates at least a portion of the first fiberglass mat, and allowing the gypsum slurry to set to form a gypsum core.

In another aspect, methods of making a gypsum panel are provided, including depositing an aqueous liquid comprising a wetting agent onto a first surface of a first fiberglass mat, depositing a gypsum slurry onto the first surface of the first fiberglass mat onto which the aqueous liquid has been deposited, prior to drying of the aqueous liquid, such that the gypsum slurry penetrates at least a portion of the first fiberglass mat, and allowing the gypsum slurry to set to form a gypsum core.

In yet another aspect a fiberglass mat is provided, including a fiberglass mat having a first surface and a second surface opposite the first surface, and a wetting agent deposited across an entire thickness of the fiberglass mat.

In still yet another embodiment, a gypsum panel is provided, including a gypsum core having a first surface and a second surface opposite the first surface, a first fiberglass mat having a first surface associated with the first surface of the gypsum core, such that gypsum of the gypsum core penetrates at least a portion of the first fiberglass mat, and a wetting agent deposited across an entire thickness of the fiberglass mat.

BRIEF DESCRIPTION OF THE DRAWINGS

Referring now to the drawings, which are meant to be exemplary and not limiting, and wherein like elements are numbered alike. The detailed description is set forth with reference to the accompanying drawings illustrating examples of the disclosure, in which use of the same reference numerals indicates similar or identical items. Certain embodiments of the present disclosure may include elements, components, and/or configurations other than those illustrated in the drawings, and some of the elements, components, and/or configurations illustrated in the drawings may not be present in certain embodiments.

DETAILED DESCRIPTION

Disclosed herein are fiberglass mats and gypsum panels, as well as methods of making such mats and panels. These panels provide advantages over commercially available gypsum panels, such as enhanced mat-to-core adhesion and related properties, reduced porosity in the mat for reducing water penetration, and/or improved weathering performance. For example, by maximizing gypsum slurry penetration into the side of the fiberglass mat receiving gypsum, the movement of water under the mat coating within the glass mat of the finished panel when exposed to bulk water head pressures may be substantially and adequately reduced, without significantly altering the water vapor transmission rate (i.e., the ability to dry) of the finished panel. Thus, the gypsum panels disclosed herein may have one or more improved water-resistive and/or air-barrier properties. As such, these panels and systems of multiple panels further provide advantages over commercially available water-resistive air barriers that are attached to traditional gypsum sheathing (e.g., mechanically attached flexible sheet, self-adhered sheets, fluid-applied membranes, spray foams), as well as over wood-based (e.g., OSB) panels, which do not display the fire resistance properties of gypsum panels.

As used herein, the term "water-resistive barrier" refers to the ability of a panel or system to resist liquid bulk water from penetrating, leaking, or seeping past the sheathing and into the surrounding wall components while also providing a water vapor transmission rate, or permeance, that is high enough to allow any moisture that does develop in the wall to dry. Combined with flashing around openings, such water-resistive barriers may create a shingled effect to direct water away from the sheathing and surrounding wall components. As used herein, the term "air barrier" refers to the ability of a panel or system to resist the movement of air into (infiltration) and out of (exfiltration) conditioned spaces, to create a more energy efficient structure. As used herein, the term "water-resistive air barrier" refers to the ability of a panel or system to display both water-resistive barrier and air barrier properties.

Gypsum sheathing panels or boards may contain a set gypsum core sandwiched between two fibrous glass mats, one or both of which may be coated. The coating may be a continuous barrier coating. As used herein, the term "continuous barrier coating" refers to a coating material that is substantially uninterrupted over the surface of the fibrous mat. The continuous barrier coating may be any suitable coating material known to those of ordinary skill in the art. For example, the coating may include a polymer or resin based binder material along with one or more inorganic fillers. The continuous barrier coating may be applied on a surface of the fiberglass mat and penetrates some portion of the thickness thereof. For example, the continuous barrier coating may penetrate from about 5 percent to about 60 percent of the thickness of a typical fiberglass mat (e.g., about 0.04 mm to about 0.4 mm of a mat having a thickness of about 0.4 mm to about 1.0 mm). For example, a coating may penetrate from about 20 percent to about 50 percent of the thickness of a typical fiberglass mat (e.g., about 0.1 mm to about 0.3 mm of a mat having a thickness of about 0.5 mm to about 0.8 mm).

During manufacturing, a gypsum slurry may be deposited on the uncoated surface of the fiberglass mat and set to form a gypsum core of the panel. The gypsum slurry may penetrate some remaining fibrous portion of the thickness of the fiberglass mat (i.e., some portion of the fiberglass mat that is not already penetrated by the coating) and provide a mechanical bond for the panel. The gypsum slurry may be provided in one or more layers, having the same or different compositions, including one or more slate coat layers. As used herein, the term "slate coat" refers to a gypsum slurry having a higher wet density than the remainder of the gypsum slurry that forms the gypsum core.

Traditional gypsum sheathing panels do not consistently pass industry standard bulk water holdout tests and therefore are typically covered with commercially available water-resistive air barriers (e.g., mechanically attached flexible sheets, self-adhered sheets, fluid-applied membranes or coatings, sprayed foams). It has been determined that water leaks in these traditional sheathing panels are formed not only because the seams and openings are not treated, but also because water under pressure is able to penetrate though pin holes in the coating on the fiberglass mat surface and travel through the glass mat along small air pockets or channels underneath the coating and along the top of the set gypsum core. This phenomenon is especially noteworthy at or near the edges of the gypsum panel, where open pockets at the gypsum core-glass mat interface are more numerous and voluminous. These air pockets, if interconnected, allow water to travel under the glass mat coating, resulting in leaks under treated seams, openings, and fasteners.

Increasing the thickness of the coating material on the fiberglass mat has been found ineffective at providing the desired water-resistive air barrier, because the extra coating weight results in a greatly reduced water vapor transmission rate and less potential for drying wet walls in service. Higher coating weights also increase manufacturing costs and reduce the flexibility of the coated fiberglass mat, making it prone to cracking at the edges.

As such, the present disclosure is directed to providing gypsum panels and sheathing systems in which such air pockets or voids are substantially eliminated, so that the panels display the desired water-resistive and air barrier properties independent of externally applied barrier products. Such improved sheathing panels may be combined with seaming components (i.e., components that treat the joints, or seams, between panels) to greatly reduce the cost, time, and complexity of installation of a water-resistive air barrier that provides the desired resistance to bulk water without affecting the water vapor transmission rate of the panel.

While this disclosure is generally directed to gypsum panels, it should be understood that other cementitious panel core materials are also intended to fall within the scope of the present disclosure. For example, cementitious panel core materials such as those including magnesium oxide or aluminosilicate may be substituted for the gypsum of the embodiments disclosed herein, to achieve similar results.

Moreover, while embodiments of the present disclosure are described generally with reference to fiberglass mats, it should be understood that other mat materials, including other fibrous mat materials, may also be used in the present panels. For example, paper mat facers known in the art may be used. In certain embodiments, the nonwoven fibrous mat is formed of fiber material that is capable of forming a strong bond with the material of the building panel core through a mechanical-like interlocking between the interstices of the fibrous mat and portions of the core material. Examples of fiber materials for use in the nonwoven mats include mineral-type materials such as glass fibers, synthetic resin fibers, and mixtures or blends thereof. Both chopped strands and continuous strands may be used.

Various embodiments of this disclosure are for purposes of illustration only. Parameters of different steps, components, and features of the embodiments are described separately, but may be combined consistently with this description of claims, to enable other embodiments as well to be understood by those skilled in the art.

Panels and Systems

Figure 1:
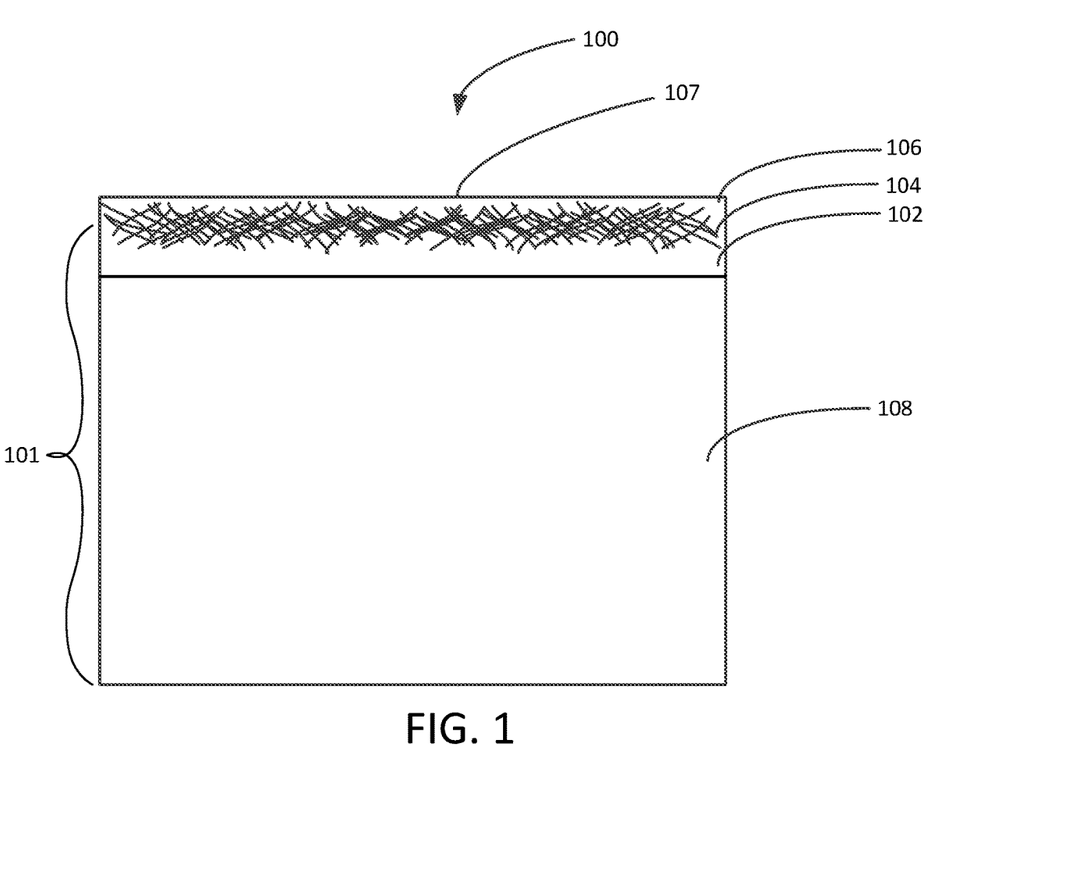
FIG. 1 is a cross-sectional view of a fiberglass faced gypsum panel having water-resistive and air-barrier properties.

In certain embodiments, as shown in FIG. 1, a gypsum panel 100 includes a gypsum core 101 having a first surface and a second opposed surface, and a first fiberglass mat 104 associated with the first surface of the gypsum core 101, such that gypsum from the gypsum core penetrates at least a portion of the first fiberglass mat 104. The various layers are illustrated as separate layers in the figures for ease of illustration; however, it should be understood that overlap of these materials may occur at their interfaces.

In some embodiments, gypsum crystals of the gypsum core 101 penetrate a remaining portion of the first fiberglass mat 104 such that voids in the first fiberglass mat 104 are substantially eliminated and the water resistance of the panel 100 is further enhanced. For example, in one embodiment, the first fiberglass mat 104 has a continuous barrier coating 106 on a surface opposite the gypsum core 101, the continuous barrier coating 106 penetrating a portion of the first fiberglass mat 104, to define the remaining portion of the first fiberglass mat 104. That is, gypsum crystals of the gypsum core 101 penetrate a remaining fibrous portion of the first fiberglass mat 104 such that voids in the first fiberglass mat 104 are substantially eliminated.

As used herein the phrase "such that voids in the fiberglass mat are substantially eliminated" and similar phrases refer to the gypsum slurry (e.g., slate coat) filling all or nearly all of the interstitial volume of the fiberglass mat that is not filled by the coating material. In certain embodiments, gypsum from the gypsum core fills at least 95 percent of the available interstitial volume of the coated fiberglass mat. In some embodiments, the gypsum core fills at least 98 percent of the available interstitial volume of the coated fiberglass mat. In further embodiments, the gypsum core fills at least 99 percent of the available interstitial volume of the coated fiberglass mat. Such panels, in which the gypsum penetrates the mat such that the voids in the mat are substantially eliminated, may be manufactured via a variety of methods, as discussed in more detail herein. Specifically, the first fiberglass mat may be treated with an aqueous liquid containing a wetting agent prior to deposition of the gypsum slurry thereon. The wetting agent promotes penetration of the gypsum into the fiberglass mat, aiding in reducing voids in the fiberglass mat. Moreover, the wetting agent provides relatively faster board drying, enhanced mat-to-core adhesion, water repellence, and membrane peel and scrub resistance.

In certain embodiments, a second surface 107 of the panel 100 formed by the first fiberglass mat 104 displays a water contact angle of at least 90 degrees, a Cobb surface water absorption measurement of 2 grams or less, or both. In some embodiments, the second surface 107 of the panel displays a Cobb surface water absorption measurement of 1 gram or less. Thus, the panels described herein may display superior surface water resistance or wettability properties. As used herein, the phrase "water contact angle" refers to the contact angle formed by a liquid in contact with the surface.

In some embodiments, in addition to the aqueous liquid containing the wetting agent being applied to the fibrous mat to aid in gypsum slurry penetration, further techniques are incorporated into the gypsum panel manufacturing process to enhance gypsum penetration into the fibrous mat and further reduce voids in the mat. For example, such additional techniques may include those disclosed in U.S. patent application Ser. Nos. 15/014,793, 15/014,821, and 15/014,922, each of which was filed on Feb. 3, 2016 and is entitled "Gypsum Panels, Systems, and Methods".

Aqueous Liquid Containing Wetting Agent

The aqueous liquid containing the wetting agent may be of any suitable chemistry, including solutions, suspensions, and emulsions of water and the wetting agent, along with any additional components as discussed herein.

In certain embodiments, the wetting agent is deposited across an entire thickness of the fiberglass mat. That is, the wetting agent is deposited across the entire thickness of the mat from the first (internal) surface of the fiberglass mat to the second opposed surface of the fiberglass mat, or to any continuous barrier coating that is present on the second surface of the fiberglass mat. As used herein, the phrases "penetrates the thickness," "is deposited across," and similar phrases, when used to described the migration of the wetting agent across the fibrous mat, refer to a wetting out of the surfaces of the fibrous mat, and do not necessarily mean that the wetting agent fills all open volume or voids of the mat.

Suitable wetting agents are discussed in further detail below.

Fiberglass Mats

In certain embodiments, fiberglass mats for use in the manufacture of sheathing panels are provided herein. For example, a fiberglass mat may have a first surface and a second surface opposite the first surface and a wetting agent deposited across an entire thickness of the fiberglass mat (e.g., across a thickness form the first surface to the second surface or from the first surface to any continuous barrier coating that is present on the second surface), as discussed in further detail herein.

In certain embodiments, the mat is a nonwoven fiberglass mat. For example, the glass fibers may have an average diameter of from about 10 to about 17 microns and an average length of from about ¼ inch to about 1 inch. For example, the glass fibers may have an average diameter of 13 microns (i.e., K fibers) and an average length of ¾ inch. In certain embodiments, the non-woven fiberglass mats have a basis weight of from about 1.5 pounds to about 3.5 pounds per 100 square feet of the mat. The mats may each have a thickness of from about 20 mils to about 35 mils. The fibers may be bonded together to form a unitary mat structure by a suitable adhesive. For example, the adhesive may be a urea-formaldehyde resin adhesive, optionally modified with a thermoplastic extender or cross-linker, such as an acrylic cross-linker, or an acrylate adhesive resin.

Continuous Barrier Coating

As discussed above, the continuous barrier coating on the external surface of the fiberglass mat may be any suitable coating known in the art. For example, the coating may include a binder material and, optionally, a filler. In certain embodiments, the coating contains filler in an amount from about 75 to about 97 weight percent. For example, the coating may contain filler in an amount from about 80 to about 95 weight percent. In one embodiment, the mat coating has a basis weight from about 3 pounds to about 9 pounds of solids per 100 square feet of the fiberglass mat. In one embodiment, the mat coating has a basis weight from about 2 pounds to about 8 pounds of solids per 100 square feet of the fiberglass mat. In certain embodiments, the binder is a polymer material. In certain embodiments, the coating on the first and/or second fiberglass mat is a latex acrylic polymer containing at least one inorganic filler.

In some embodiments, the binder of the continuous mat coating is a polymer latex adhesive. For example, the binder may be styrene-butadiene-rubber (SBR), styrene-butadiene-styrene (SBS), ethylene-vinyl-chloride (EVCl), poly-vinylidene-chloride (PVdCl) and poly(vinylidene) copolymers, modified poly-vinyl-chloride (PVC), poly-vinyl-alcohol (PVOH), ethylene-vinyl-acetate (EVA), poly-vinyl-acetate (PVA) and polymers and copolymers containing units of acrylic acid, methacrylic acid, their esters and derivatives thereof (acrylic-type polymers), such as styrene-acrylate copolymers.

In one embodiment, the binder of the continuous mat coating is a hydrophobic, UV resistant polymer latex adhesive. For example, the hydrophobic, UV resistant polymer latex binder adhesive may be based on a (meth)acrylate polymer latex, wherein the (meth)acrylate polymer is a lower alkyl ester, such as a methyl, ethyl or butyl ester, of acrylic and/or methacrylic acids, and copolymers of such esters with minor amounts of other ethylenically unsaturated copolymerizable monomers (such as styrene) which are known to the art to be suitable in the preparation of UV resistant (meth)acrylic polymer latexes.

In certain embodiments, the continuous barrier coating also includes water and/or other optional ingredients such as colorants (e.g., dyes or pigments), transfer agents, thickeners or rheological control agents, surfactants, ammonia compositions, defoamers, dispersants, biocides, UV absorbers, and preservatives. Thickeners may include hydroxyethyl cellulose; hydrophobically modified ethylene oxide urethane; processed attapulgite, a hydrated magnesium aluminosilicate; and other thickeners known to those of ordinary skill in the art. For example, thickeners may include CELLOSIZE QP-09-L and ACRYSOL RM-2020NPR, commercially available from Dow Chemical Company (Philadelphia, Pa.); and ATTAGEL 50, commercially available from BASF Corporation (Florham Park, N.J.). Surfactants may include sodium polyacrylate dispersants, ethoxylated nonionic compounds, and other surfactants known to those of ordinary skill in the art. For example, surfactants may include HYDROPALAT 44, commercially available from BASF Corporation; and DYNOL 607, commercially available from Air Products (Allentown, Pa.). Defoamers may include multi-hydrophobe blend defoamers and other defoamers known to those of ordinary skill in the art. For example, defoamers may include FOAMASTER SA-3, commercially available from BASF Corporation. Ammonia compositions may include ammonium hydroxide, for example, AQUA AMMONIA 26 BE, commercially available from Tanner Industries, Inc. (Southampton, Pa.). Biocides may include broad-spectrum microbicides that prohibit bacteria and fungi growth, antimicrobials such as those based on the active diiodomethyl-ptolylsulfone, and other compounds known to those of ordinary skill in the art. For example, biocides may include KATHON LX 1.5%, commercially available from Dow Chemical Company, POLYPHASE 663, commercially available from Troy Corporation (Newark, N.J.), and AMICAL Flowable, commercially available from Dow Chemical Company. Biocides may also act as preservatives. UV absorbers may include encapsulated hydroxyphenyl-triazine compositions and other compounds known to those of ordinary skill in the art, for example, TINUVIN 477DW, commercially available from BASF Corporation. Transfer agents such as polyvinyl alcohol (PVA) and other compounds known to those of ordinary skill in the art may also be included in the coating composition.

In certain embodiments, a hydrophobic latex or resin material can be included in the continuous mat coating to further improve the water repellence and reduce the water infiltration and enhance bonding between glass mat and gypsum.

Fillers used in the continuous mat coating may include inorganic mineral fillers, such as ground limestone (calcium carbonate), clay, mica, gypsum (calcium sulfate dihydrate), aluminum trihydrate (ATH), antimony oxide, sodium-potassium alumina silicates, pyrophyllite, microcrystalline silica, talc (magnesium silicate), and other fillers known to those of ordinary skill in the art. In certain embodiments, the filler may inherently contain a naturally occurring inorganic adhesive binder. For example, the filler may be limestone containing quicklime (CaO), clay containing calcium silicate, sand containing calcium silicate, aluminum trihydrate containing aluminum hydroxide, cementitious fly ash, or magnesium oxide containing either the sulfate or chloride of magnesium, or both. In certain embodiments, the filler may include an inorganic adhesive binder as a constituent, cure by hydration, and act as a flame suppressant. For example, the filler may be aluminum trihydrate (ATH), calcium sulfate (gypsum), and the oxychloride and oxysulfate of magnesium. For example, fillers may include MINEX 7, commercially available from the Cary Company (Addison, Ill.); IMSIL A-10, commercially available from the Cary Company; and TALCRON MP 44-26, commercially available from Specialty Minerals Inc. (Dillon, Mont.). The filler may be in a particulate form. For example, the filler may have a particle size such that at least 95% of the particles pass through a 100 mesh wire screen.

Gypsum Core

In certain embodiments, as shown in FIG. 1, the gypsum core 101 includes two or more gypsum layers 102, 108. For example, the gypsum core may include various gypsum layers having different compositions. In some embodiments, the first gypsum layer 102 that is in contact with the fiberglass mat 104 (i.e., the layer that forms an interface with the coating material and at least partially penetrates the remaining fibrous portion of the first fiberglass mat) is a slate coat layer. In some embodiments, the first gypsum layer 102 is present in an amount from about 5 percent to about 20 percent, by weight, of the gypsum core 101. The various gypsum layers are shown as separate layers in the figures for ease of illustration; however, it should be understood that overlap of these materials may occur at their interfaces.

In some embodiments, the slurry that forms the gypsum layer having an interface with the barrier coating also includes a wetting agent to facilitate penetration of the slurry into the fibrous mat. This slurry may form the entire gypsum core or may form one or more layers of the gypsum core. That is, one or more layers forming the gypsum core may contain the wetting agent. As discussed in more detail below, the wetting agent may be any agent that reduces the surface tension of the slurry. In certain embodiments, the first gypsum layer includes a wetting agent in an amount effective to bring a slurry surface tension of the first gypsum layer to 65 dyne/cm or less. In certain embodiments, the first gypsum layer includes a wetting agent in an amount effective to bring a slurry surface tension of the first gypsum layer to 60 dyne/cm or less. In certain embodiments, the first gypsum layer includes a wetting agent in an amount effective to bring a slurry surface tension of the first gypsum layer to 55 dyne/cm or less. In certain embodiments, the first gypsum layer includes a wetting agent in an amount effective to bring a slurry surface tension of the first gypsum layer to from about 30 dyne/cm to about 60 dyne/cm. In certain embodiments, the first gypsum layer includes a wetting agent in an amount effective to bring a slurry surface tension of the first gypsum layer to from about 40 dyne/cm to about 60 dyne/cm. In certain embodiments, the first gypsum layer includes a polymer binder or an inorganic binder in an amount of from about 0.5 lb/1000 ft$^2$ to about 50 lb/1000 ft$^2$, in the set gypsum layer. In certain embodiments, the first gypsum layer includes a polymer binder or an inorganic binder in an amount of from about 0.5 lb/1000 ft$^2$ to about 15 lb/1000 ft$^2$, in the set gypsum layer.

In some embodiments, the first gypsum layer has a wet density of from about 88 pcf to about 98 pcf. In some embodiments, the first gypsum layer has a wet density of from about 93 pcf to about 96 pcf.

In certain embodiments, penetration of the gypsum slurry into the fibrous mat is further encouraged with a polymer binder coating or an inorganic binder coating on a surface of the first fiberglass mat that contacts the gypsum core. In some embodiments, the mat coating comprises a wetting agent in an amount effective to bring a wet surface tension of the coating to 60 dyne/cm or less. In some embodiments, the mat coating comprises a wetting agent in an amount effective to bring a wet surface tension of the coating to from about 30 dyne/cm to about 60 dyne/cm. In some embodiments, the mat coating comprises a wetting agent in an amount effective to bring a wet surface tension of the coating to from about 40 dyne/cm to about 60 dyne/cm.

Figure 2:
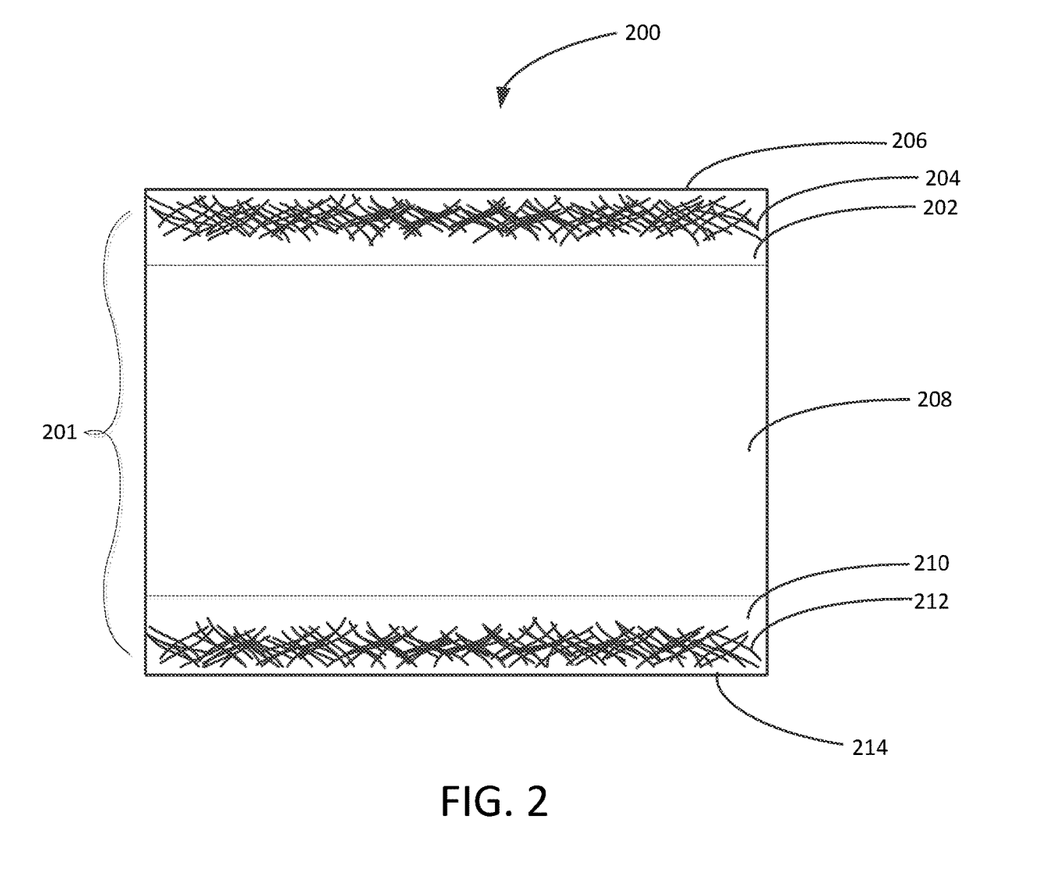
FIG. 2 is a cross-sectional view of a fiberglass faced gypsum panel having water-resistive and air-barrier properties.

In certain embodiments, as shown in FIG. 2, a gypsum panel 200 includes two fiberglass mats 204, 212 that are associated with the gypsum core 201. The second fiberglass mat 212 is present on a face of the gypsum core 201 opposite the first fiberglass mat 204. In some embodiments, only the first fiberglass mat 204 has a continuous barrier coating 206 on a surface thereof. In other embodiments, both fiberglass mats 204, 212 have a coating 206, 214 on a surface thereof opposite the gypsum core 201. In some embodiments, the gypsum core 201 includes three gypsum layers 202, 208, 210. One or both of the gypsum layers 202, 210 that are in contact with the fiberglass mats 204, 212 may be a slate coat layer. In certain embodiments, one or both of the gypsum layers 202, 210 that are in contact with the fiberglass mats 204, 212 may be a slate coat layer with hydrophobic characteristics and/or a wet density of from about 88 pcf to about 98 pcf, or of from about 93 pcf to about 96 pcf.

The layers of the gypsum core may be similar to gypsum cores used in other gypsum products, such as gypsum wallboard, dry wall, gypsum board, gypsum lath, and gypsum sheathing. For example, the gypsum core may be formed by mixing water with powdered anhydrous calcium sulfate or calcium sulfate hemihydrate, also known as calcined gypsum, to form an aqueous gypsum slurry, and thereafter allowing the slurry mixture to hydrate or set into calcium sulfate dihydrate, a relatively hard material. In certain embodiments, the gypsum core includes about 80 weight percent or above of set gypsum (i.e., fully hydrated calcium sulfate). For example, the gypsum core may include about 85 weight percent set gypsum. In some embodiments, the gypsum core includes about 95 weight percent set gypsum. The gypsum core may also include a variety of additives, such as accelerators, set retarders, foaming agents, and dispersing agents.

In certain embodiments, one or more layers of the gypsum core also include reinforcing fibers, such as chopped glass fibers. For example, the gypsum core, or any layer thereof, may include up to about 0.6 pounds of reinforcing fibers per 100 square feet of panel. For example, the gypsum core, or a layer thereof, may include about 0.3 pounds of reinforcing fibers per 100 square feet of panel. The reinforcing fibers may have a diameter between about 10 and about 17 microns and have a length between about 6.35 and about 12.7 millimeters.

The gypsum core, or one or more layers thereof, such as one or more slate coat layers, may also include an additive that improves the water-resistant properties of the core. Such additives may include, for example, poly(vinyl alcohol), optionally including a minor amount of poly(vinyl acetate); metallic resinates; wax, asphalt, or mixtures thereof, for example as an emulsion; a mixture of wax and/or asphalt and cornflower and potassium permanganate; water insoluble thermoplastic organic materials such as petroleum and natural asphalt, coal tar, and thermoplastic synthetic resins such as poly(vinyl acetate), poly(vinyl chloride), and a copolymer of vinyl acetate and vinyl chloride, and acrylic resins; a mixture of metal rosin soap, a water soluble alkaline earth metal salt, and residual fuel oil; a mixture of petroleum wax in the form of an emulsion and either residual fuel oil, pine tar, or coal tar; a mixture of residual fuel oil and rosin; aromatic isocyanates and diisocyanates; organopolysiloxanes; siliconates; wax emulsions, including paraffin, microcrystalline, polyethylene, and various co-emulsified wax emulsions; wax asphalt emulsion, each optionally with potassium sulfate, alkali, or alkaline earth aluminates, and Portland cement; a wax-asphalt emulsion prepared by adding to a blend of molten wax and asphalt, an oil-soluble, water-dispersing emulsifying agent, and admixing the aforementioned with a solution of case including, as a dispersing agent, an alkali sulfonate of a polyarylmethylene condensation product. Mixtures of these water-resistance additives may also be employed. For example, a mixture of two or more of: poly(vinyl alcohol), siliconates, wax emulsion, and wax-asphalt emulsion of the aforementioned types, may be used to improve the water resistance of the gypsum core, or gypsum slate coat layer(s) thereof.

The gypsum core, or one or more layers thereof, may also include one or more additives that enhance the inherent fire resistance of the gypsum core. Such additives may include chopped glass fibers, other inorganic fibers, vermiculite, clay, Portland cement, and other silicates, among others.

Properties of Gypsum Panels

In certain embodiments, the panels have a thickness from about ¼ inch to about 1 inch. For example, the panels may have a thickness of from about ½ inch to about ⅝ inch.

By maximizing gypsum slurry penetration into the side of the fiberglass mat receiving gypsum, at least through the use of an aqueous liquid containing a wetting agent deposited on the fibrous mat prior to application of the gypsum slurry thereto, the movement of water under the mat coating within the glass mat of the finished panel when exposed to bulk water head pressures may be substantially and adequately reduced, without significantly altering the water vapor transmission rate (i.e., the ability to dry) of the finished panel.

Thus, the gypsum panels disclosed herein may have one or more improved water-resistive barrier properties.

In certain embodiments, the gypsum panel passes a hydrostatic head test against water leakage, as measured by AATCC 127-2008. In addition to hydrostatic head pressure tests, other similar tests can be used to assess bulk water resistance in the range of 0.32 inches water (1.67 psf) to 44 inches of water head pressure (228 psf). This may include but is not limited to other water head tests (such as ASTM E2140), water ponding tests, cobb tests (such as ASTM C473, ASTM D3285, ASTM D5795, ASTM D7433, ASTM D7281), or a chambered test aided by vacuum or negative pressure differentials. Thus, the gypsum panels described herein may pass any combination of the foregoing tests.

In certain embodiments, the gypsum panel has a water vapor permeance of at least 10 (inch-pound units per ASTM E96 wet cup method), in the field of the panel (i.e., not at the edge of the panel). In some embodiments, the gypsum panel has a water vapor permeance of at least 30 (inch pound units per ASTM E96 wet cup method), in the field of the panel. In some embodiments, the gypsum panel has a water vapor permeance of at least 32 (inch pound units per ASTM E96 wet cup method), in the field of the panel. In certain embodiments, the gypsum panel displays water vapor transmission properties as determined by desiccant methods or by other methods including high and low relative humidity or dynamic pressure levels.

In certain embodiments, the gypsum panel displays an air penetration resistance of 0.02 L/sm$^2$ at 75 Pa, or less, when measured according to ASTM E2178. In certain embodiments, the gypsum panel displays an air penetration resistance of 0.02 L/sm$^2$ at 300 Pa, or less, when measured according to ASTM E2178.

In certain embodiments, the gypsum panel is fire-resistant. In certain embodiments, the gypsum panel is classified as noncombustible when tested in accordance with ASTM E136 or CAN/ULC S114 and complies with ASTM C1177 requirements for glass mat gypsum substrates designed to be used as exterior sheathing for weather barriers. In particular, a ⅝ inch panel may have increased fire resistance over other sheathing substrates, such as cellulosic based sheathing. In some embodiments, the gypsum panel has a "Type X" designation, when measured according to ASTM E119. The gypsum panels may meet "Type X" designation when tested in accordance with ASTM E119 fire tests for both generic (Generic systems in the GA-600 Fire Resistance Design Manual) and proprietary building assembly wall designs. ASTM E119 is designed to test the duration for which a building assembly can contain a fire and retain structural integrity under a controlled fire with a standard time/temperatures curve. In certain embodiments, the gypsum panel has a level 0 flame spread index and smoke develop index, when measured according to ASTM E84. For example, when exposed to surface burning characteristics, per ASTM E84 or CAN/ULC-S102, the flame spread index and smoke develop index for the gypsum panel may be 0.

Building Sheathing Systems

Building sheathing systems are also provided herein, and include at least two of the improved water-resistive air barrier gypsum panels described herein, including any features, or combinations of features, of the panels described herein. For example, the gypsum panels may each include a gypsum core associated with a first fiberglass mat having a barrier coating, the coating penetrating a portion of the first fiberglass mat opposite the gypsum core, wherein gypsum of the gypsum core penetrates a remaining fibrous portion of the first fiberglass mat such that voids in the first fiberglass mat are substantially eliminated.

Figure 3:
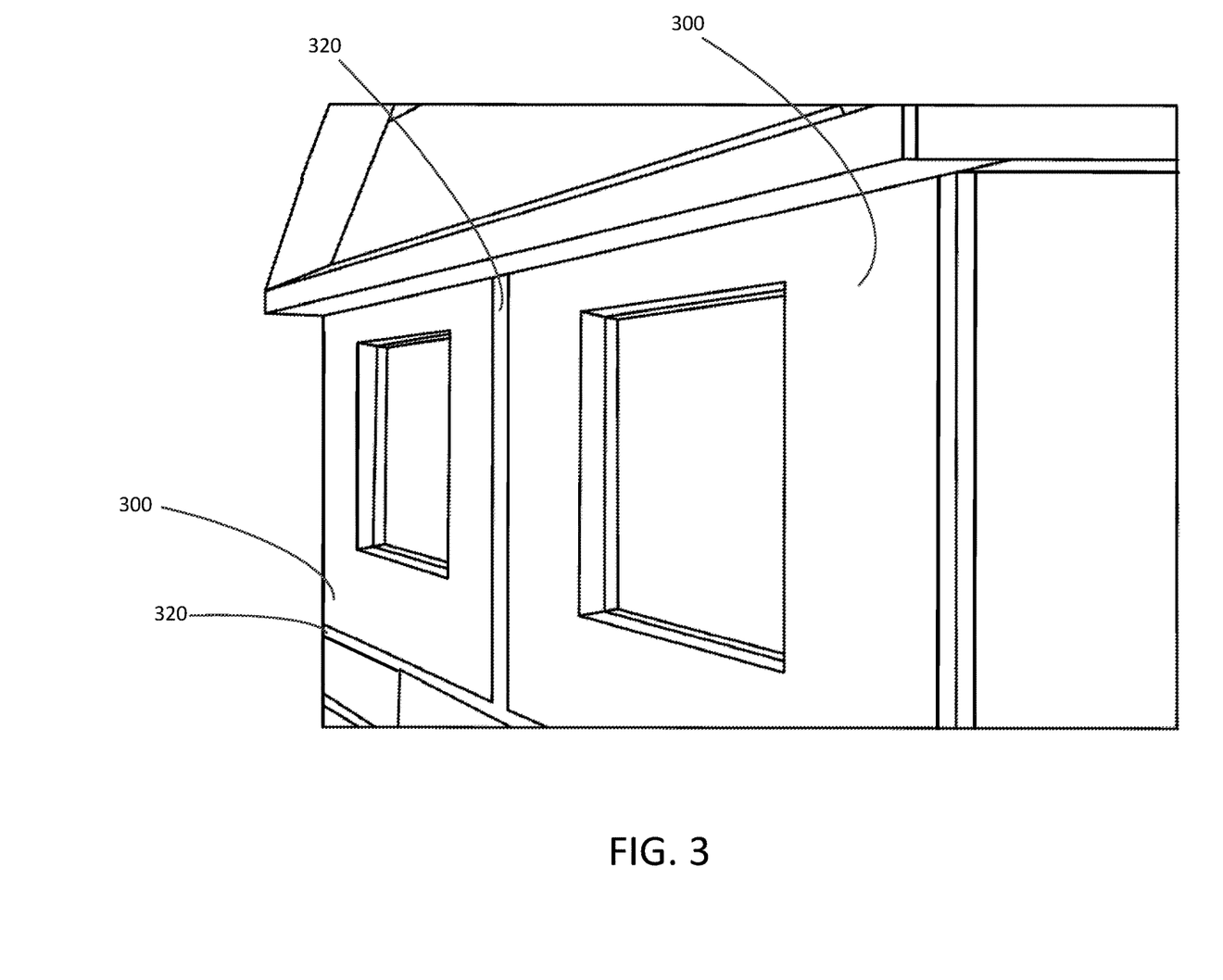
FIG. 3 is a perspective view of a building sheathing system having water-resistive and air-barrier properties.

In certain embodiments, as shown in FIG. 3, a building sheathing system includes at least two gypsum panels 300 and a seaming component 320 configured to provide a seam at an interface between at least two of the gypsum panels 300.

In certain embodiments, the seaming component comprises tape or a bonding material. For example, the seaming component may be a tape including solvent acrylic adhesives, a tape having a polyethylene top layer with butyl rubber adhesive, a tape having an aluminum foil top layer with butyl rubber adhesive, a tape having an EPDM top layer with butyl rubber adhesive, a tape having a polyethylene top layer with rubberized asphalt adhesive, or a tape having an aluminum foil top layer with rubberized asphalt adhesive. For example, the seaming component may be a bonding material such as synthetic stucco plasters, cement plasters, synthetic acrylics, sand filled acrylics, solvent based acrylics, solvent based butyls, polysulfides, polyurethanes, silicones, silyl modified polymers, water-based latexes, EVA latexes, or acrylic latexes.

Thus, the above-described enhanced panels may be installed with either a tape, liquid polymer, or other suitable material, to effectively treat areas of potential water and air intrusion, such as seams, door/window openings, penetrations, roof/wall interfaces, and wall/foundation interfaces. As such, the building sheathing panels, when used in combination with a suitable seaming component, create an effective water-resistive and/or air-barrier envelope.

Such building sheathing systems may advantageously pass any or all ICC-ES tests required for water resistant and air barrier system performance. For example, the sheathing systems may pass Sections 4.1, 4.2, 4.3, 4.4, 4.7, and/or 4.8 of the ICC-ES Acceptance Criteria for water-resistive coatings used as water-resistive barriers over exterior sheathing (ICC Evaluation Service Acceptance Criteria 212), dated February 2015. For example, the sheathing systems may pass Section 4.5 of the ICC-ES Acceptance Criteria for water-resistive membranes factory bonded to wood-based structural sheathing, used as water-resistive barriers (ICC Evaluation Service Acceptance Criteria 310), dated May 2008, revised June 2013.

In certain embodiments, the building sheathing system including at least two gypsum panels and a seaming component displays no water leaks when measured according ICC Evaluation Service Acceptance Criteria 212, Section 4. This test uses an 8' by 8' wall assembly built with multiple gypsum panels and having two vertical joint treatments and one horizontal joint treatment with seaming component(s) (as described in more detail herein) and flashing treatment with seaming component(s). The wall is subjected to 10 positive transverse load cycles of ASTM E2357 (procedure A), to racking loads of ASTM E72 to obtain a net deflection of ⅛ inch with hold-downs, and then to restrained environmental conditioning cycles as described in AC 212 section 4.7.3 for two weeks. Thus, in some embodiments, the building sheathing system displays no water leaks when measured according to ICC Evaluation Service Acceptance Criteria 212, Section 4, after being subjected to the test methods of ASTM E2357 procedure A, ASTM E72, and restrained environmental conditioning. The cycled wall is then tested under ASTM E331 water penetration with a water spray of 5 gal/ft$^2$-hr and air pressure differential of 2.86 psf maintained for 15 minutes, and resulting in no leaks within the field of the panel or cracking of sheathing or seaming components.

Thus, in some embodiments, the building sheathing system displays no water leaks when measured according to the ASTM E331 wall assembly test at an air pressure differential of 2.86 psf, 6.24 psf, or even 8.58 psf. The ASTM E331 test may be a water spray after a structural test and/or a test including the building transitions, openings, and penetrations. In addition to ASTM E331, other suitable tests may be substituted, such as tests using chambers that spray or flood the exposed side of the wall or are rotated to receive bulk water and create a negative air pressure differential on the inside cavity in order to expose leaks. This may include but is not limited to ASTM E547, ASTM D5957, AAMA 501, or field testing apparatus such as ASTM E1105. Thus, the building sheathing systems described herein may pass any combination of the foregoing tests.

In certain embodiments, the building sheathing system displays an air penetration resistance of 0.02 L/sm$^2$ at 75 Pa, or less, when measured according to ASTM E2178. In certain embodiments, the sheathing system displays an air penetration resistance of 0.02 L/sm$^2$ at 300 Pa, or less, when measured according to ASTM E2178.

In certain embodiments, the building sheathing system displays an exfiltration and infiltration air leakage rate of less than 0.04 cfm/ft$^2$ at 1.57 lbs/ft$^2$ (75 Pa), when measured according to the ASTM E2357 air barrier assembly test for both opaque walls and walls with penetration, when 8' by 8' walls are prepared using seaming components to seal joints, window openings, duct penetrations, pipe penetrations, external junction boxes, and masonry ties. In some embodiments, the ASTM E2357 wall assemblies, after being is exposed to Q10>0.20 kPa pressure design value wind loads for sustained, cyclic, and gust loads display an air leakage infiltration and exfiltration rate of less than 0.04 cfm/ft$^2$ at 6.27 lbs/ft$^2$ (300 Pa). In certain embodiments, the building sheathing system displays an exfiltration and infiltration air leakage rate of less than 0.02 cfm/ft$^2$ at 1.57 lbs/ft$^2$ (75 Pa), when measured according to the ASTM E2357 air barrier assembly test for both opaque walls and walls with penetration. In addition to ASTM E2357, other tests may be used to quantify air leakage in this range, including ASTM E283, ASTM E2319, ASTM E1424, ASTM E283, ASTM E1424, or similar test methods. Also, related field testing to test pressure differentials, in this range, such as ASTM E783 or related blower door apparatus testing may also be used. Thus, the building sheathing systems described herein may pass any combination of the foregoing tests.

In some embodiments, the system passes a hydrostatic head test against water leakage, as measured by AATCC 127-2008. In certain embodiments, the building sheathing system passes AATCC hydrostatic head test method 127-2008 for a 22-inch head of water (114 psf water pressure) directly over an interface of at least two gypsum panels and the seaming component, with no leaks after 5 hours. In addition to hydrostatic head pressure, other similar tests can be used to assess bulk water resistance in the range of 0.32 inches water (1.67 psf) to 44 inches of water head pressure (228 psf). This may include but is not limited to other water head tests (such as ASTM E2140), water ponding test, cobb tests (such as ASTM C473, ASTM D3285, ASTM D5795, ASTM D7433, ASTM D7281), or a chambered test aided by vacuum or negative pressure differentials. Thus, the building sheathing systems described herein may pass any combination of the foregoing tests.

In certain embodiments, the system passes AC310-2008, which tests water-resistive membranes and barriers. In some embodiments, the system passes AAMA 714 standard for liquid-applied flashing.

In certain embodiments, the sheathing system has a water vapor permeance of at least 10 (inch-pound units per ASTM E96 wet cup method). In certain embodiments, the sheathing system has a water vapor permeance of at least 20 (inch-pound units per ASTM E96 wet cup method).

Accordingly, the presently described systems are especially effective along the edges of the panel, which are traditionally more susceptible to leaks when installed in a finished system.

Thus, in certain embodiments, the sheathing system (i) passes a hydrostatic head test against water leakage, as measured by AATCC 127-2008, (ii) displays no water leaks when measured according to ICC Evaluation Service Acceptance Criteria 212, Section 4, after being subjected to the test methods of ASTM E2357 procedure A, ASTM E72, and restrained environmental conditioning, and/or (iii) displays no water leaks when measured according to ASTM E331 wall assembly test at an air pressure of 2.86 psf, 6.24 psf, or 8.58 psf. Therefore, the sheathing system may display certain levels of water resistive properties. Additionally, such sheathing systems may further display desired water vapor permeance, air penetration resistance, air leakage rate, and fire resistant properties. These sheathing systems therefore provide a water resistive air barrier in the absence of any externally applied barrier product, other than the seaming component. That is, no mechanically attached flexible barrier sheet material, self-adhered barrier sheet material, fluid-applied membranes, spray foam membrane, or other barrier product need be applied to the external field of the panels to achieve the water-resistive air barrier properties.

Thus, in certain embodiments, the sheathing system includes panels having a gypsum core (one or more layers, optionally including one or more slate coat layers) and a fiberglass mat facer, wherein an aqueous liquid containing a wetting agent has been applied to the fiberglass mat facer during the panel manufacturing process, which panels display the water-resistive air barrier properties described herein, independent of any barrier product (e.g., mechanically attached flexible barrier sheet material, self-adhered barrier sheet material, fluid-applied membranes, spray foam membrane) being applied to the external surface of the panel during building construction.

Methods

Methods of making gypsum panels having water-resistive properties, and fiberglass mats therefor, are also provided. In certain embodiments, methods of making a fiberglass mat include depositing an aqueous liquid containing a wetting agent onto a first surface of a first fiberglass mat. In some embodiments, the aqueous liquid containing the wetting agent penetrates an entire thickness of the fiberglass mat. In certain embodiments, methods of making a gypsum panel include depositing an aqueous liquid containing a wetting agent onto a first surface of a first fiberglass mat and depositing a gypsum slurry onto the first surface of the first fiberglass mat onto which the aqueous liquid has been deposited such that the gypsum slurry penetrates at least a portion of the first fiberglass mat, and allowing the gypsum slurry to set to form a gypsum core. In certain embodiments, the gypsum slurry is deposited onto the fiberglass mat prior to drying of the aqueous liquid. That is, the gypsum slurry is deposited prior to complete evaporation of the water in which the wetting agent is applied to the fibrous mat. It has been found that applying the gypsum slurry to the fibrous mat at a time when the aqueous liquid remains wet aids in enhancing the penetration of the gypsum slurry into the mat.

These methods may be used to produce gypsum panels having any of the features, or combinations of features, described herein. For example, enhanced penetration of the gypsum into the fiberglass mat may be achieved by application of the penetration-enhancing wetting agent to the fibrous mat contacted by the gypsum slurry.

Aqueous Liquid Containing Wetting Agent

The aqueous liquid containing the wetting agent is applied to the fibrous mat to enhance the penetration of the gypsum slurry into the remaining voids of the fibrous mat upon application of the gypsum slurry thereto. As discussed above, in certain embodiments, the e gypsum slurry is deposited onto the fiberglass mat prior to drying of the aqueous liquid containing the wetting agent, to maximize the effect of the wetting agent.

In certain embodiments, the aqueous liquid is applied to the fibrous mat such that the wetting agent penetrates an entire thickness of the mat, as discussed above. The aqueous liquid may be applied to a mat that has been coated with a continuous barrier coating on a surface opposite the surface to which the aqueous liquid containing the wetting agent is applied, or to an uncoated mat. In some embodiments, the aqueous liquid is applied to the fibrous mat such that the gypsum slurry applied to the fibrous mat penetrates the mat such that voids in the mat are substantially eliminated.

In certain embodiments, the wetting agent is present in the aqueous liquid in an amount of from about 0.05 percent to about 1 percent, such as in an amount of from about 0.1 percent to about 0.5 percent, or in an amount of about 0.05 percent to about 0.2 percent, by weight of the liquid components of the aqueous liquid (i.e., not including any solids present in the aqueous liquid).

The wetting agent may be any suitable chemical that acts to lower surface tension. That is, the wetting agent may be any suitable agent that acts to lower the surface tension of the gypsum slurry applied to the glass mat. For example, the wetting agent may have a wet surface tension that is lower than the surface tension of water. For example, the wetting agent may have a wet surface tension of about 50 dyne/cm or less. In certain embodiments, the aqueous liquid contains the wetting agent in an amount effective to bring a wet surface tension of the solution to 60 dyne/cm or less, such as from about 40 dyne/cm to about 60 dyne/cm.

In certain embodiments, the wetting agent is selected from a group consisting of surfactants, superplasticisers, dispersants, agents containing surfactants, agents containing superplasticisers, agents containing dispersants, and combinations thereof. Specifically, suitable wetting agents may be selected from non-ionic, anionic, cationic, or zwitterionic compounds, such as alkyl sulfates, ammonium lauryl sulfate, sodium lauryl sulfate, alkyl-ether sulfates, sodium laureth sulfate, sodium myreth sulfate, docusates, dioctyl sodium sulfosuccinate, perfluorooctanesulfonate, perfluorobutanesulfonate, linear alkylbenzene sulfonates, alkyl-aryl ether phosphates, alkyl ether phosphate, alkyl carboxylates, sodium stearate, sodium lauroyl sarcosinate, carboxylate-based fluorosurfactants, perfluorononanoate, perfluorooctanoate, amines, octenidine dihydrochloride, alkyltrimethylammonium salts, cetyl trimethylammonium bromide, cetyl trimethylammonium chloride, cetylpyridinium chloride, benzalkonium chloride, benzethonium chloride, 5-Bromo-5-nitro-1,3-dioxane, dimethyldioctadecylammonium chloride, cetrimonium bromide, dioctadecyldimethylammonium bromide, sultaines, cocamidopropyl hydroxysultaine, betaines, cocamidopropyl betaine, phospholipids phosphatidylserine, phosphatidylethanolamine, phosphatidylcholine, sphingomyelins, fatty alcohols, cetyl alcohol, stearyl alcohol, cetostearyl alcohol, stearyl alcohols. oleyl alcohol, polyoxyethylene glycol alkyl ethers, octaethylene glycol monododecyl ether, pentaethylene glycol monododecyl ether, polyoxypropylene glycol alkyl ethers, glucoside alkyl ethers, polyoxyethylene glycol octylphenol ethers, polyoxyethylene glycol alkylphenol ethers, glycerol alkyl esters, polyoxyethylene glycol sorbitan alkyl esters, sorbitan alkyl esters, cocamide MEA, cocamide DEA, dodecyldimethylamine oxide, polyethoxylated tallow amine, and block copolymers of polyethylene glycol and polypropylene glycol.

In certain embodiments, the wetting agent is a surfactant. In some embodiments, the surfactant is selected from a group including multifunctional agents based on acetylenic chemistry, ethoxylated low-foam agents, siloxane-based surfactants, and nonionic superwetting and coalescing surfactants. For example, suitable surfactants include Surfynol 61 (multifunctional agent based on acetylenic chemistry), Surfynol 440 (ethoxylated low-foam wetting agent), Dynol 980 (siloxane-based surfactant), Dynol 360 (nonionic superwetting and coalescing surfactant), and similar agents, all commercially available from Air Products and Chemicals, Inc. (Allentown, Pa.).

In certain embodiments, the wetting agent is a surfactant having a boiling point of 200° C. or lower. In some embodiments, the surfactant has a boiling point of 150° C. or lower. In some embodiments, the surfactant has a boiling point of 110° C. or lower. For example, the surfactant may be a multifunctional agent based on acetylenic chemistry or an ethoxylated low-foam agent. Without intending to be bound by a particular, it is believed that use of a surfactant having such a low boiling or decomposition temperature encourages evaporation and thereby loss of wetting functionality during the board drying process. In particular, high Cobb (surface water absorption) was found in certain boards due to residual surfactants left in the glass mat on board surface, which promoted wetting again and increased surface water absorption. Even at higher board drying temperatures, the temperature was still not high enough to evaporate off all surfactants, and Cobb remained high. Therefore the low boiling point surfactants advantageously demonstrate increased surface evaporation and resulting low Cobb (water absorption) properties.

In certain embodiments, the wetting agent is deposited onto the first fiberglass mat in an amount of at least about 0.01 lb/1,000 ft$^2$, such as from about 0.01 lb/1,000 ft$^2$ to about 1 lb/1,000 ft$^2$, from about 0.01 lb/1,000 ft$^2$ to about 5 lb/1,000 ft$^2$, or from about 0.01 lb/1,000 ft$^2$ to about 10 lb/1,000 ft$^2$.

In some embodiments, the aqueous liquid containing the wetting agent is free of any polymer or inorganic binders. In particular, it has been found that an aqueous liquid containing a wetting agent, even absent a binder, provides the desired improved gypsum slurry penetration. In other embodiments, the aqueous liquid contains a binder in addition to the wetting agent. For example, the binder may be any suitable binder as discussed above with reference to gypsum layer additives. In certain embodiments, the binder is a polymer or inorganic binder, such as a latex binder that is free of filler.

In certain embodiments, depositing the aqueous liquid onto the fibrous mat includes spraying, curtain coating, rolling, brushing, knife coating, or wire rod application of the coating onto the first surface of the mat. In certain embodiments, the aqueous liquid is deposited onto a fibrous surface of the fiberglass mat by a roll coater, knife coater, curtain coater, wire-rod coater, spraying, or combinations thereof. In some embodiments, the method includes vacuuming excess aqueous liquid from the first fiberglass mat after depositing the aqueous binder coating thereon.

Continuous Barrier Coating

In certain embodiments, the external surface of the fibrous mat is coated with a continuous barrier coating that penetrates a portion of the first fiberglass mat, to define the remaining portion of the first fiberglass mat that gypsum crystals of the gypsum core penetrate.

In certain embodiments, the first and/or second fibrous mats are already coated upon contacting the gypsum (or other panel core) slurry. In some embodiments, the methods include applying the continuous coating to the first and/or second fibrous mat, either before or after contacting the mats with the panel core slurry. In certain embodiments, applying the barrier coating includes spray coating, ribbon coating, or direct roll coating. In some embodiments, the barrier coating is applied to each of the first and/or second fibrous mats in an amount from about 1 pound to about 9 pounds, per 100 ft$^2$. For example, the barrier coating may be applied to the first and/or second fibrous mat in an amount from about 2 pounds to about 8 pounds, per 100 ft$^2$. In other embodiments, coated fibrous mats may be obtained in a pre-fabricated form.

Gypsum Core

In certain embodiments, the gypsum core includes multiple layers that are sequentially applied to the fiberglass mat, and allowed to set either sequentially or simultaneously. In other embodiments, the gypsum core includes a single layer. In some embodiments, a second fiberglass mat may be deposited onto a surface of the final gypsum slurry layer (or the sole gypsum slurry layer), to form a dual mat-faced gypsum panel. For example, the second fiberglass mat may include a barrier coating on its surface that penetrates a portion of the mat. The gypsum slurry or multiple layers thereof may be deposited on the fiberglass mat by any suitable means, such as roll coating.

In certain embodiments, depositing the gypsum slurry includes depositing a first gypsum slurry having a wet density of from about 88 pcf to about 98 pcf onto the surface of a fiberglass mat, the first gypsum slurry. In certain embodiments, the first gypsum slurry has a wet density of from about 93 pcf to about 96 pcf. In some embodiments, the gypsum core includes at least three gypsum layers, with the outermost gypsum layers of the gypsum core (i.e., the layers that form an interface with the fiberglass mats) being slate coat layers. In certain embodiments, both outermost layers have a relatively high density or are otherwise chemically altered for enhanced penetration. Thus, a third gypsum slurry may have a wet density of from about 88 pcf to about 98 pcf, or from about 93 pcf to about 96 pcf.

In certain embodiments, depositing the gypsum slurry includes depositing a first gypsum slurry containing a wetting agent, as described in more detail below. The first gypsum slurry may be the first of multiple gypsum layers deposited to form the gypsum core (i.e., a slate coat layer), or the first gypsum slurry may be the sole gypsum layer deposited to form the gypsum core. The first gypsum slurry (or both of the outermost gypsum slurries) may contain a wetting agent in an amount effective to reduce a surface tension of the first gypsum slurry to 65 dyne/cm or less, measured on the aqueous liquid after solid ingredients are filtered out. In certain embodiments, the first gypsum slurry contains a wetting agent in an amount effective to reduce a surface tension of the first gypsum slurry to 60 dyne/cm or less. In certain embodiments, the first gypsum slurry contains a wetting agent in an amount effective to reduce a surface tension of the first gypsum slurry to 55 dyne/cm or less. In certain embodiments, the first gypsum slurry includes a wetting agent in an amount effective to reduce a surface tension of the first gypsum slurry to from about 40 dyne/cm to about 65 dyne/cm. The reduced surface tension of aqueous liquid in the gypsum slurry enhances the slurry penetration into the glass mat, in reference to the pure water surface tension of 72 dyne/cm at 25° C. In certain embodiments, the first gypsum slurry (or each of the outermost gypsum slurry layers) is deposited in an amount of from about 5 percent to about 20 percent, by weight, of the gypsum core.

In certain embodiments, the wetting agent is selected from a group consisting of surfactants, superplasticisers, dispersants, agents containing surfactants, agents containing superplasticisers, agents containing dispersants, and combinations thereof. For example, the gypsum slurry or layer(s) may include wax, wax emulsions and co-emulsions, silicone, siloxane, or a combination thereof. For example, suitable superplasticisers include Melflux 2651 F and 4930F, commercially available from BASF Corporation.

In certain embodiments, the wetting agent is a surfactant having a boiling point of 200° C. or lower. In some embodiments, the surfactant has a boiling point of 150° C. or lower. In some embodiments, the surfactant has a boiling point of 110° C. or lower. For example, the surfactant may be a multifunctional agent based on acetylenic chemistry or an ethoxylated low-foam agent. Without intending to be bound by a particular, it is believed that use of a surfactant having such a low boiling or decomposition temperature encourages evaporation an thereby loss of wetting functionality during the board drying process. In particular, high Cobb (surface water absorption) was found in certain boards due to residual surfactants left in the glass mat on board surface, which promoted wetting again and increased surface water absorption. Even at higher board drying temperatures, the temperature was still not high enough to evaporate off all surfactants, and Cobb remained high. Therefore the low boiling point surfactants advantageously demonstrate increased surface evaporation and resulting low Cobb (water absorption) properties. In certain embodiments, there is no residual wetting agent present in the set gypsum core.

In certain embodiments, the surfactant is present in the first gypsum slurry in an amount of about 0.01 percent to about 1 percent, by weight. In certain embodiments, the surfactant is present in the first gypsum slurry in an amount of about 0.01 percent to about 0.5 percent, by weight. In some embodiments, the surfactant is present in the first gypsum slurry in an amount of about 0.05 percent to about 0.2 percent, by weight.

Suitable surfactants and other wetting agents may be selected from non-ionic, anionic, cationic, or zwitterionic compounds, such as alkyl sulfates, ammonium lauryl sulfate, sodium lauryl sulfate, alkyl-ether sulfates, sodium laureth sulfate, sodium myreth sulfate, docusates, dioctyl sodium sulfosuccinate, perfluorooctanesulfonate, perfluorobutanesulfonate, linear alkylbenzene sulfonates, alkyl-aryl ether phosphates, alkyl ether phosphate, alkyl carboxylates, sodium stearate, sodium lauroyl sarcosinate, carboxylate-based fluorosurfactants, perfluorononanoate, perfluorooctanoate, amines, octenidine dihydrochloride, alkyltrimethylammonium salts, cetyl trimethylammonium bromide, cetyl trimethylammonium chloride, cetylpyridinium chloride, benzalkonium chloride, benzethonium chloride, 5-Bromo-5-nitro-1,3-dioxane, dimethyldioctadecylammonium chloride, cetrimonium bromide, dioctadecyldimethylammonium bromide, sultaines, cocamidopropyl hydroxysultaine, betaines, cocamidopropyl betaine, phospholipids phosphatidylserine, phosphatidylethanolamine, phosphatidylcholine, sphingomyelins, fatty alcohols, cetyl alcohol, stearyl alcohol, cetostearyl alcohol, stearyl alcohols. oleyl alcohol, polyoxyethylene glycol alkyl ethers, octaethylene glycol monododecyl ether, pentaethylene glycol monododecyl ether, polyoxypropylene glycol alkyl ethers, glucoside alkyl ethers, polyoxyethylene glycol octylphenol ethers, polyoxyethylene glycol alkylphenol ethers, glycerol alkyl esters, polyoxyethylene glycol sorbitan alkyl esters, sorbitan alkyl esters, cocamide MEA, cocamide DEA, dodecyldimethylamine oxide, polyethoxylated tallow amine, and block copolymers of polyethylene glycol and polypropylene glycol. For example, suitable surfactants include Surfynol 61, commercially available from Air Products and Chemicals, Inc. (Allentown, Pa.).

In certain embodiments, the gypsum slurry (or one or more layers thereof) includes a hydrophobic additive. For example, the gypsum slurry or layer(s) may include wax, wax emulsions and co-emulsions, silicone, siloxane, silanes, or any combination thereof.

In certain embodiments, the first gypsum slurry includes, alternatively to or in addition to the surfactant, an aqueous polymer or inorganic binder to enhance penetration of the slurry into the mat. In certain embodiments, the first gypsum slurry includes the binder in an amount effective to provide from about 0.5 lb/1000 ft$^2$ to about 50 lb/1000 ft$^2$ binder in the set gypsum layer. In one embodiment, the first gypsum slurry includes the binder in an amount effective to provide from about 0.5 lb/1000 ft$^2$ to about 15 lb/1000 ft$^2$ binder in the set gypsum layer. For example, the binder may be a suitable latex binder, such as a hydrophobic modified acrylic latex binder. In one embodiment, the latex binder is one with low surface tension, such as ENCOR 300, commercially available from Arkema (France).

For example, the binder may be styrene-butadiene-rubber (SBR), styrene-butadiene-styrene (SBS), ethylene-vinyl-chloride (EVCl), poly-vinylidene-chloride (PVdCl) and poly(vinylidene) copolymers, modified poly-vinyl-chloride (PVC), poly-vinyl-alcohol (PVOH), ethylene-vinyl-acetate (EVA), poly-vinyl-acetate (PVA) and polymers and copolymers containing units of acrylic acid, methacrylic acid, their esters and derivatives thereof (acrylic-type polymers), such as styrene-acrylate copolymers. In one embodiment, the binder is a hydrophobic, UV resistant polymer latex adhesive. For example, the hydrophobic, UV resistant polymer latex binder adhesive may be based on a (meth)acrylate polymer latex, wherein the (meth)acrylate polymer is a lower alkyl ester, such as a methyl, ethyl or butyl ester, of acrylic and/or methacrylic acids, and copolymers of such esters with minor amounts of other ethylenically unsaturated copolymerizable monomers (such as styrene) which are known to the art to be suitable in the preparation of UV resistant (meth)acrylic polymer latexes. In certain embodiments, the binder coating is free of filler.

In certain embodiments, the gypsum slurry (or one or more layers thereof) is substantially free of foam, honeycomb, excess water, and micelle formations. As used herein, the term "substantially free" refers to the slurry containing lower than an amount of these materials that would materially affect the performance of the panel. That is, these materials are not present in the slurry in an amount that would result in the formation of pathways for liquid water in the glass mat of a set panel, when under pressure.

In some embodiments, the gypsum core includes at least three gypsum layers, with the outermost gypsum layers of the gypsum core (i.e., the layers that form an interface with the fiberglass mats). In certain embodiments, both outermost layers are chemically altered for enhanced penetration.

Mechanical Vibration of Panels

In some embodiments, the method also includes mechanically vibrating at least the first fiberglass mat having the first gypsum slurry deposited thereon to effect penetration of the gypsum slurry into the remaining fibrous portion of the first fiberglass mat. In certain embodiments, the method includes passing at least the first fiberglass mat having the first gypsum slurry deposited thereon over a vibration table. For example, a fiberglass mat having only one layer of gypsum slurry deposited thereon (such as the slate coat), or a fiberglass mat having multiple gypsum slurry layers, and optionally a second fiberglass mat opposite the first fiberglass mat, may be passed over a vibration table. In certain embodiments, the first fiberglass mat and gypsum slurry are passed over the vibration table prior to the panel being passed through a forming plate. In certain embodiments, the vibration table includes at least one vibrating plate configured to display a mean vibration of from about 5 in/s to about 10 in/s. In certain embodiments, the vibration table includes at least one vibrating plate configured to vibrate at a frequency of from about 32 Hz to about 20 kHz. In some embodiments, the fiberglass mat and gypsum are passed over two sequential vibrating plates. It has been found that compared to traditional rolls having nubs thereon, the vibration tables achieve superior gypsum slurry penetration of the fiberglass mat.

Other Process Parameters and Properties

In certain embodiments, the panel core slurry (or layers thereof) may be deposited on the non-coated side of a horizontally oriented moving web of pre-coated fibrous mat. A second coated or uncoated fibrous mat may be deposited onto the surface of the panel core slurry opposite the first coated fibrous mat, e.g., a non-coated surface of the second coated fibrous mat contacts the panel core slurry. In some embodiments, a moving web of a pre-coated or uncoated nonwoven fibrous mat may be placed on the upper free surface of the aqueous panel core slurry. Thus, the panel core material may be sandwiched between two fibrous mats, one or both having a barrier coating. In certain embodiments, allowing the panel core material and/or continuous barrier coating to set includes curing, drying, such as in an oven or by another suitable drying mechanism, or allowing the material(s) to set at room temperature (i.e., to self-harden).

Gypsum panels disclosed herein advantageously display improved core-to-mat adhesion and gypsum penetration into the mat, leading to improved surface water resistance and weathering performance.

Methods of constructing a building sheathing system, as shown in FIG. 3, are also provided herein, including installing at least two gypsum panels 300 having an interface therebetween, and applying a seaming component 320 at the interface between the at least two of the gypsum panels 300.

Gypsum panels used in these methods may have any of the features, properties, or combinations of features and/or properties, described herein. Sheathing systems constructed by these methods may have any of the features, properties, or combinations or features and/or properties, described herein. The seaming component may be any suitable seaming component as described herein.

Thus, the gypsum sheathing panels and building sheathing systems disclosed herein display water-resistive and air-barrier properties that were previously achieved in gypsum panels only through attaching separate water-resistive air barriers (e.g., mechanically attached flexible sheet, self-adhered sheets, fluid-applied membranes, spray foams) thereto. Because gypsum panels display fire resistance properties, these panels and systems provide advantages over wood-based (e.g., OSB) panels.

In these gypsum panels and sheathing systems, air pockets or voids are substantially eliminated, so that the panels display the desired water resistive barrier and air barrier properties independent of externally applied barrier products. These improved sheathing panels may be combined with seaming components (i.e., components that treat the joints, or seams, between panels) to greatly reduce the cost, time, and complexity of installation of a water-resistive air barrier that provides the desired resistance to bulk water without affecting the water vapor transmission rate of the panel. Accordingly, the disclosed system advantageously eliminates the need for applying further materials to a gypsum panel (e.g., either a membrane or liquid/foam material) to achieve water-resistive air barrier properties, when the seams are treated, and also provides fire resistance.

While the disclosure has been described with reference to a number of embodiments, it will be understood by those skilled in the art that the invention is not limited to such disclosed embodiments. Rather, the invention can be modified to incorporate any number of variations, alterations, substitutions, or equivalent arrangements not described herein, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A gypsum panel, comprising:
    a gypsum core having a first surface and a second surface opposite the first surface;
    a first fiberglass mat having a first surface associated with the first surface of the gypsum core, such that gypsum of the gypsum core penetrates at least a portion of the first fiberglass mat; and
    a wetting agent deposited across an entire thickness of the first fiberglass mat, wherein the wetting agent is deposited onto the first fiberglass mat in an uncoated state of the first fiberglass mat, such that the wetting agent penetrates the entire thickness of the first fiberglass mat,
    wherein the wetting agent penetrating the entire thickness of the first fiberglass mat facilitates the penetration of gypsum of the gypsum core such that voids in the first fiberglass mat are substantially eliminated.

2. The gypsum panel of claim 1, wherein the wetting agent is a surfactant.

3. The gypsum panel of claim 2, wherein the surfactant is selected from a group consisting of multifunctional acetylenic agents, ethoxylated low-foam agents, siloxane-based surfactants, and nonionic superwetting and coalescing surfactants.

4. The gypsum panel of claim 2, wherein the surfactant has a boiling point of 200° C. or lower.

5. The gypsum panel of claim 2, wherein the surfactant has a boiling point of 150° C. or lower.

6. The gypsum panel of claim 2, wherein the surfactant has a boiling point of 110° C. or lower.

7. The gypsum panel of claim 1, wherein the wetting agent is deposited across the first fiberglass mat in an amount of about 0.01 lb/1,000 ft$^2$ to about 10 lb/1,000 ft$^2$.

8. The gypsum panel of claim 1, wherein the wetting agent is deposited across the first fiberglass mat in an amount of about 0.01 lb/1,000 ft$^2$ to about 5 lb/1,000 ft$^2$.

9. The gypsum panel of claim 1, wherein the wetting agent is deposited across the first fiberglass mat in an amount of about 0.01 lb/1,000 ft$^2$ to about 1 lb/1,000 ft$^2$.

10. The gypsum panel of claim 1, further comprising a barrier coating continuous along a second surface of the first fiberglass mat opposite the first surface.

11. The gypsum panel of claim 1, further comprising a second fiberglass mat associated with the second surface of the gypsum core.

12. The gypsum panel of claim 1, wherein the wetting agent has a wet surface tension of about 50 dyne/cm or less.

13. A gypsum panel, comprising:
    a gypsum core having a first surface and a second surface opposite the first surface;
    a first fiberglass mat having a first surface associated with the first surface of the gypsum core, such that gypsum of the gypsum core penetrates at least a portion of the first fiberglass mat; and
    a wetting agent deposited across an entire thickness of the first fiberglass mat, wherein the wetting agent is deposited onto the first fiberglass mat in an uncoated state of the first fiberglass mat, such that the wetting agent penetrates the entire thickness of the first fiberglass mat,
    wherein the wetting agent is a surfactant selected from a group consisting of multifunctional acetylenic agents, ethoxylated low-foam agents, siloxane-based surfactants, and nonionic superwetting and coalescing surfactants,
    wherein the wetting agent is deposited across the first fiberglass mat in an amount of about 0.01 lb/1,000 ft$^2$ to about 10 lb/1,000 ft$^2$, and
    wherein the wetting agent penetrating the entire thickness of the first fiberglass mat facilitates the penetration of gypsum of the gypsum core such that voids in the first fiberglass mat are substantially eliminated.

14. The gypsum panel of claim 13, wherein the surfactant has a boiling point of 200° C. or lower.

15. The gypsum panel of claim 13, wherein the surfactant has a boiling point of 110° C. or lower.

16. The gypsum panel of claim 13, wherein the wetting agent is deposited across the first fiberglass mat in an amount of about 0.01 lb/1,000 ft$^2$ to about 1 lb/1,000 ft$^2$.

17. The gypsum panel of claim 13, further comprising a barrier coating continuous along a second surface of the first fiberglass mat opposite the first surface.

18. The gypsum panel of claim 13, wherein the wetting agent has a wet surface tension of about 50 dyne/cm or less.

* * * * *